United States Patent Office.

WILLIAM M. DAVIS, OF CLEVELAND, OHIO, ASSIGNOR TO HIMSELF AND WILLIAM L. BECKWITH, OF THE SAME PLACE.

Letters Patent No. 65,063, dated May 28, 1867.

IMPROVED COMPOUND FOR REFINING CIDER, ALE, &c.

*The Schedule referred to in these Letters Patent and making part of the same.*

TO ALL WHOM IT MAY CONCERN:

Be it known that I, WILLIAM M. DAVIS, of Cleveland, county of Cuyahoga, in the State of Ohio, have invented a new and improved Chemical Compound for Refining and Clarifying Cider, Wine, Ale, Sorghum, and other fermenting and unfermenting liquids; and I do hereby declare that the following is a full and exact description thereof.

The nature of the improvement in this compound consists in its refining and clarifying properties for the preservation of cider, ale, wine, sorghum, and other fermenting and unfermenting liquids.

The following is the manner of preparing the compound, which, to enable others to fully understand, I will proceed to describe.

For cider: To sixteen ounces of codfish sounds add four ounces calcined alum and eight ounces common salt, put into cask containing ten gallons partially fermented cider. Let this remain ten days to macerate, being agitated daily, then take out the mass and rub it through a coarse sieve of about one-fourth inch mesh, the sieve being placed upon an open barrel. When this is done, stir the mass briskly fifteen or twenty minutes, when it will become foamy and have the consistency of yeast. To a forty-gallon barrel of cider add one gallon of this compound, stirring briskly for ten minutes, letting it stand forty-eight hours with bung out; (the barrel should not be quite full;) then close and let remain. This will thoroughly clarify and refine the cider, and render it perfectly free from all impurities.

For ale: The proportion of ingredients is the same, except in place of cider use sour ale for macerating the ingredients, and one-half more of the finings, viz, one and a half gallon to forty gallons ale.

For wine: The proportion of ingredients the same as above, except in place of cider or ale for macerating ingredients, use a slightly diluted wine, and dispensing with alum, unless the wine lacks astringents; if so, add a little alum water with a little tannic acid, which will hasten the finings.

For sorghum: The juice is to be put into large open casks or hogsheads or vats, standing sufficiently high to rack off four inches from the bottom, and in a cool place. The gelatine must be macerated in three parts water and one part sirup, (which has been fitted for market.) The sirup is not to be added until the maceration has taken place, and the ingredients put through the sieve. Then stir the whole mass thoroughly, but add no more sirup than you wish to use each time, as it may sour. For refining use the same proportions as for ale—one and one-half gallon to forty of sorghum.

This may also be used in small quantities for refining by heat, but refined gelatine is preferable diluted in warm water to the consistency of thin glue. Use half pint to ten gallons. Skim before using.

Having thus described the composition and its objects, I claim the composition above described, compounded of the ingredients above mentioned, or their known equivalents, substantially as and for the purpose set forth.

W. M. DAVIS.

Witnesses:
   GEO. W. TIBBITTS,
   A. J. MARVIN.